(12) United States Patent
Zhou et al.

(10) Patent No.: US 10,554,869 B2
(45) Date of Patent: Feb. 4, 2020

(54) CAMERA ASSEMBLY AND MOBILE ELECTRONIC DEVICE

(71) Applicant: GUANGDONG OPPO MOBILE TELECOMMUNICATIONS CORP., LTD., Dongguan, Guangdong (CN)

(72) Inventors: Yibao Zhou, Guangdong (CN); Jiao Cheng, Guangdong (CN); Haiping Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/968,718

(22) Filed: May 1, 2018

(65) Prior Publication Data

US 2018/0324342 A1    Nov. 8, 2018

(30) Foreign Application Priority Data

May 3, 2017   (CN) .......................... 2017 1 0305887

(51) Int. Cl.
*H04N 5/225* (2006.01)
*H04N 5/232* (2006.01)
(Continued)

(52) U.S. Cl.
CPC ........ *H04N 5/2258* (2013.01); *H04M 1/0264* (2013.01); *H04N 5/2257* (2013.01); *H04N 5/2351* (2013.01); *H04N 5/23245* (2013.01)

(58) Field of Classification Search
None
See application file for complete search history.

(56) References Cited

U.S. PATENT DOCUMENTS

| 2007/0116447 A1* | 5/2007 | Ye ........................ G03B 13/34 396/79 |
| 2008/0122821 A1* | 5/2008 | Nilsson .................. G03B 17/20 345/207 |

(Continued)

FOREIGN PATENT DOCUMENTS

| CN | 1669313 A   | 9/2005 |
| CN | 101582985 A | 11/2009 |

(Continued)

OTHER PUBLICATIONS

European Patent Application No. 18169883.8 extended Search and Opinion dated Jul. 19, 2018, 10 pages.

(Continued)

*Primary Examiner* — Cynthia Segura
(74) *Attorney, Agent, or Firm* — Lathrop Gage LLP

(57) ABSTRACT

A camera assembly and a mobile electronic device are provided. The camera assembly includes at least two image sensors. Each image sensor includes a pixel array and a control circuit. The pixel array includes a plurality of row pixels and a plurality of column pixels. The control circuit is configured to control the image sensor to work in an imaging mode or in a light sensing mode. The control circuit is further configured to receive a light sensing instruction to control an intersection region of a part of row pixels and a part of column pixels to detect an illumination intensity so as to enable the image sensor to work in the light sensing mode and to receive an imaging instruction to control the pixel array to obtain an image so as to enable the image sensor to work in the imaging mode.

18 Claims, 7 Drawing Sheets

(51) Int. Cl.
*H04N 5/235* (2006.01)
*H04M 1/02* (2006.01)

(56) References Cited

U.S. PATENT DOCUMENTS

| | | | |
|---|---|---|---|
| 2009/0084943 A1* | 4/2009 | Solhusvik | G01J 1/02 |
| | | | 250/214 AL |
| 2012/0092541 A1* | 4/2012 | Tuulos | H04N 5/23245 |
| | | | 348/333.01 |
| 2013/0076712 A1 | 3/2013 | Zheng et al. | |
| 2014/0063288 A1* | 3/2014 | Suh | H04N 5/2353 |
| | | | 348/229.1 |
| 2015/0046505 A1 | 2/2015 | Sun et al. | |
| 2015/0264241 A1* | 9/2015 | Kleekajai | H04N 5/2351 |
| | | | 348/227.1 |
| 2015/0264278 A1* | 9/2015 | Kleekajai | H04N 5/2351 |
| | | | 348/227.1 |
| 2016/0212318 A1* | 7/2016 | Masuoka | H04N 5/23293 |
| 2018/0324286 A1* | 11/2018 | Cheng | G01J 1/4204 |
| 2018/0324287 A1* | 11/2018 | Zhou | H04M 1/0264 |
| 2019/0020823 A1* | 1/2019 | Jeon | H04N 5/23296 |

FOREIGN PATENT DOCUMENTS

| | | |
|---|---|---|
| CN | 203104564 U | 7/2013 |
| CN | 104517585 A | 4/2015 |
| CN | 104780316 A | 7/2015 |
| CN | 106303273 A | 1/2017 |
| CN | 107222664 A | 9/2017 |
| KR | 20120067050 A | 6/2012 |

OTHER PUBLICATIONS

PCT/CN2018/085361 English translation of International Search Report and Written Opinion dated Jul. 25, 2018, 11 pages.
Chinese Patent Application No. 201710305887.9 English translation of Office Action dated Mar. 8, 2019, 8 pages.
Chinese Patent Application No. 201710305887.9 Office Action dated Mar. 8, 2019, 8 pages.

* cited by examiner

CAMERA ASSEMBLY AND MOBILE ELECTRONIC DEVICE

CROSS-REFERENCE TO RELATED APPLICATIONS

This application is based on and claims priority of Chinese Patent Application No. 201710305887.9, filed on May 3, 2017, the entire contents of which are incorporated herein by reference.

FIELD

The present disclosure relates to electronic devices, and more particularly to a camera assembly, and a mobile electronic device.

BACKGROUND

Typically, a front camera configured to capture a selfie and a light sensor configured to detect ambient brightness to realize adjusting brightness of a display screen according to the ambient brightness can be set on a cell phone. However, since the front camera and the light sensor are separately set in the most of phones at present, the space for locating the display screen in the phone decreases, thus leading to a low screen-to-body ratio of the phone.

DISCLOSURE

Embodiments of the present disclosure provide a camera assembly and a mobile electronic device.

The camera assembly according to embodiments of the present disclosure includes at least two image sensors. Each image sensor includes a pixel array and a control circuit. The pixel array includes a plurality of row pixels and a plurality of column pixels. The control circuit is configured to control the image sensor to work in an imaging mode or in a light sensing mode. The control circuit is further configured to receive a light sensing instruction to control an intersection region of a part of the row pixels and a part of column pixels in the pixel array to detect an illumination intensity, so as to enable the image sensor to work in the light sensing mode; and to receive an imaging instruction to control the pixel array to acquire an image, so as to enable the image sensor to work in the imaging mode.

The mobile electronic device according to embodiments of the present disclosure includes the camera assembly described above and a processor. The processor is configured to generate the light sensing instruction and the imaging instruction.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

Figure 1:
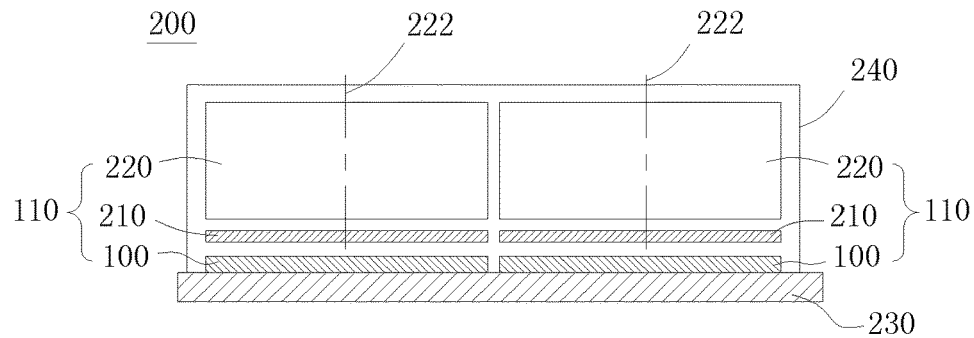
FIG. 1 is a schematic diagram of a camera assembly according to an embodiment of the present disclosure.
Figure 2:
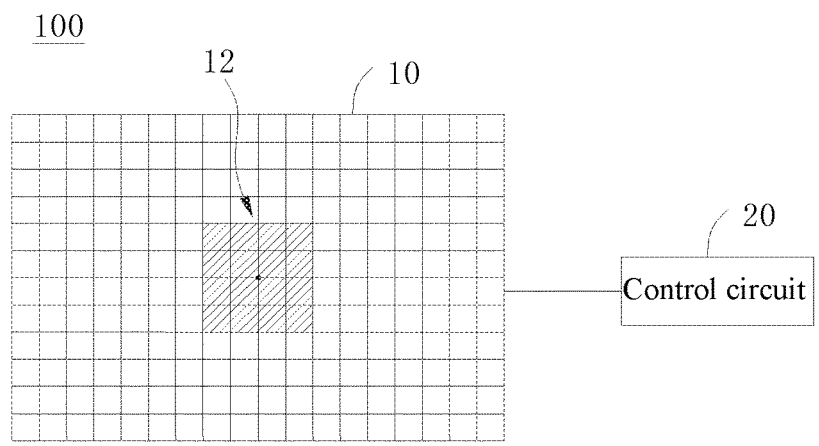
FIG. 2 is a schematic diagram of an image sensor according to an embodiment of the present disclosure.

Referring to FIG. 1 and FIG. 2, the camera assembly 200 according to embodiments of the present disclosure includes two lens assemblies 110. Each lens assembly 110 includes an image sensor 100. Each image sensor 100 includes a pixel array 10 and a control circuit 20. The pixel array 10 includes a plurality of row pixels and a plurality of column pixels. The control circuit 20 is configured to control the image sensor 100 to work in an imaging mode or in a light sensing mode.

The control circuit 20 is further configured to receive a light sensing instruction to control an intersection region of a part of row pixels and a part of column pixels of the pixel array 10 to detect an illumination intensity when the image sensor 100 works in the light sensing mode, and to receive an imaging instruction to control the pixel array 10 to acquire an image when the image sensor 100 works in the imaging mode.

According to embodiments of the present disclosure, since the image sensor 100 has both the imaging mode and the light sensing mode, it is unnecessary to set both a camera component and a light sensor component in the electronic device such as a cell phone, such that the space for locating the display screen in the electronic device such as the cell phone is increased, thus enlarging a screen-to-body ratio of the cell phone.

In some embodiments, in each image sensor 100, each row pixel includes a plurality of pixels, and each column pixel includes a plurality of pixels. Each pixel can obtain an illumination intensity signal and an imaging signal. Thus, when the image sensor 100 works in the imaging mode, the pixel array 10 can obtain an external image formed on a surface of the pixel array 10. When the image sensor 100 works in the light sensing mode, the pixel array 10 can obtain the illumination intensity of light irradiated on the pixels.

In some embodiments, the control circuit 20 may control the intersection region 12 to perform a photographic process according to the light sensing instruction. When light in current environment reaches each pixel in the intersection region 12, a light sensor component corresponding to each pixel in the intersection region 12 can generate voltage change, such that a pixel value corresponding to each pixel can be obtained. The illumination intensity can be obtained through computation based on a series of pixel values obtained from the intersection region 12.

The control circuit 20 may control the pixel array 10 to acquire the image according to the imaging instruction. When light in the current environment reaches each pixel in the pixel array 10, a light sensor component corresponding to each pixel in the pixel array 10 can generate voltage change, such that a pixel value corresponding to each pixel can be obtained. The final image can be obtained by performing an interpolation and de-mosaic processing according to a series of pixel values obtained from the pixel array 10.

When the image sensor 100 works in the imaging mode, all or a part of pixels in the pixel array 10 can be controlled to acquire the image. In other words, an imaging region of the pixel array 10 may be an entire region of the pixel array 10 or may be a partial region of the pixel array 10.

The intersection region 12, configured as a light sensing region of the pixel array 10, may include a plurality of pixels. Each pixel in the intersection region 12 corresponds to both a row pixel and a column pixel. For example, one pixel in the intersection region 12 corresponds to the $4^{th}$ row pixel and the $4^{th}$ column pixel. The control circuit 20 may control each pixel in the pixel array 10 to work separately, so as to control the intersection region 12 to be in an operating state while other regions to be in an idle state.

Figure 3:
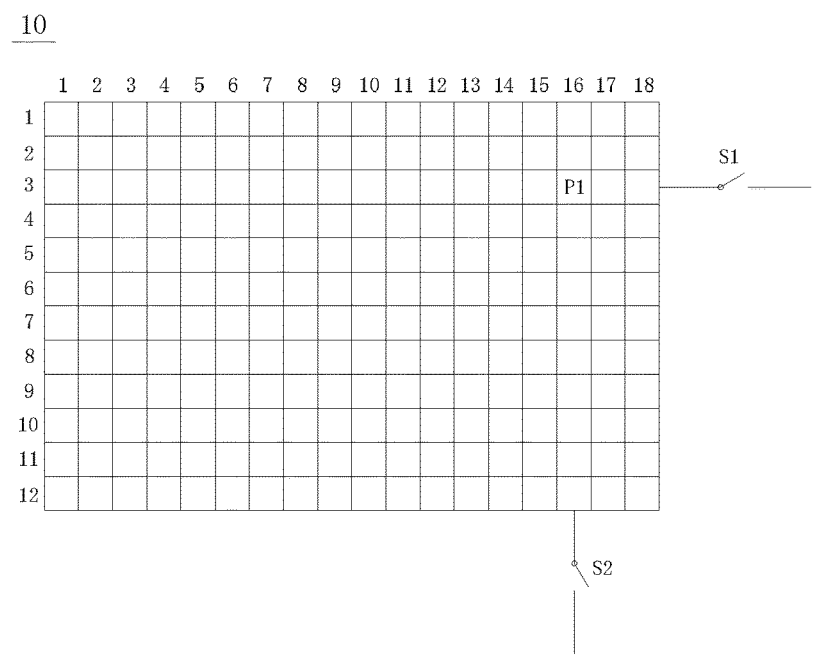
FIG. 3 is a schematic diagram of a pixel array according to an embodiment of the present disclosure.

In some embodiments, a row pixel is associated with a switch, while a column pixel is associated with another switch. When the both switches are turned on, a pixel corresponding to both the row pixel and the column pixel is enabled to work. As illustrated in FIG. 3, a pixel corresponding to both the $3^{rd}$ row pixel and the $16^{th}$ column pixel is P1. The $3^{rd}$ row pixel is coupled to a first switch S1 and the $16^{th}$ column pixel is coupled to a second switch S2. When both the first and second switches S1 and S2 are turned on, the pixel P1 is enabled to work. In some embodiments, a single pixel can be enabled to work in other ways. For example, each pixel is coupled to a single switch, when the single switch is turned on, the corresponding pixel starts to work.

When the image sensor 100 works in the imaging mode, the intersection region 12 can also acquire the external image. Further, in some embodiments of the present disclosure, the pixel array is in the shape of a square. In some embodiments, the pixel array 10 may be in the shape of a polygon or a circle etc., which is not limited herein.

Since the camera assembly 200 includes two lens assemblies 110 and each lens assembly 110 includes an image sensor 100, the camera assembly 200 includes two image sensors 100. Each of the two image sensors 100 may work in the imaging mode, in the light sensing mode, or in the idle mode.

Each of the left image sensor 100 and the right image sensor 100 illustrated in FIG. 1 may work in the imaging mode, in the light sensing mode or in the idle mode respectively. The camera assembly 200 according to embodiments of the present disclosure may be applied in an electronic device 300. Thus, the operating state of the electronic device 300 may be one of nine situations in table 1.

TABLE 1

|  | No. | Left image sensor | Right image sensor |
|---|---|---|---|
| Operating state | 1 | Imaging mode | Idle mode |
|  | 2 | Imaging mode | Imaging mode |
|  | 3 | Imaging mode | Light sensing mode |
|  | 4 | Light sensing mode | Idle mode |
|  | 5 | Light sensing mode | Imaging mode |
|  | 6 | Light sensing mode | Light sensing mode |
|  | 7 | Idle mode | Imaging mode |
|  | 8 | Idle mode | Light sensing mode |
|  | 9 | Idle mode | Idle mode |

The idle mode of the image sensor 100 means that the image sensor 100 is not in the imaging mode or in the light sensing mode, thus the image sensor 100 cannot detect the illumination intensity or acquire the image.

In some embodiments, when the left image sensor 100 is in the imaging mode and the right image sensor 100 is in the imaging mode, both the left lens assembly 110 and the right lens assembly 110 can acquire images.

In some embodiments, the left lens assembly 110 may be a wide-angle lens assembly, while the right lens assembly 110 may be a telephoto lens assembly. The left lens assembly 110 can acquire a wide-angle image, and the right lens assembly 110 can acquire a telephoto image. An image with high quality can be acquired by merging the wide-angle image and the telephoto image.

In some embodiments, when both of the two lens assemblies 110 acquire the images, the two lens assemblies 110 can realize imaging simultaneously to acquire multiple frames of first images and multiple frames of second images. The processor 310 may analyze the multiple frames of first images and the multiple frames of second images and screens out a frame of image with highest imaging quality as a final image. In another embodiment, the processor 310 may perform merging and splicing processing on the first image and the second image to enhance color and definition of the final image.

In some embodiments, one lens assembly 110 may be configured to assist the other lens assembly 110 in imaging, so as to optimize the imaging quality. For example, the one lens assembly 110 may detect the current ambient brightness, and the processor 310 analyzes the ambient brightness to control exposure time of each light sensor component corresponding to each pixel in the other lens assembly 110 to obtain the image with suitable brightness. In this way, during the imaging of the camera assembly 200, one lens assembly 110 is used to detect the ambient brightness to assist the other lens assembly 110 in imaging, such that problems that the final image is subject to overexposure or has too low brightness can be avoided, thus improving the image quality.

As illustrated in FIG. 1, in some embodiments, each lens assembly 110 includes a filter 210. The filter 210 is disposed above the image sensor 100.

In some embodiments, the filter 210 is an RGB filter 210, such that an image with high quality can be acquired by the image sensor 100. The RGB filter 210 can be arranged in Bayer array to allow light L to pass through the filter 210 and pass through the pixel array 10, so as to acquire a color image.

In some embodiments, the filter 210 may be a visible filter 210. In this way, after the light passes through the visible filter 210, only visible light of the light can reach the pixel array 10 while light with other wavelengths is blocked, such that the intersection region 12 can be configured to detect the illumination intensity of the visible light and the pixel array 10 can be configured to acquire the image, thus avoiding interference of invisible light in the light, and improving accuracy of light detection and quality of the image.

In some embodiments, each lens assembly 110 further includes a lens 220 disposed above the filter 210. The optical axis 222 of the lens 220 is aligned with the center of the image sensor 100.

In some embodiments, the light passing through the lens 220 can reach respective regions of the image sensor 100 equally, such that the image sensor 100 can have a better imaging effect and can detect the illumination intensity better.

In some embodiments, the camera assembly 200 further includes a circuit board 230 and a housing 240. Both of the two image sensors 100 are arranged on the circuit board 230. Both of the two lenses 220 are arranged in the housing 240, and fixedly coupled to the housing 240.

The image sensor 100 will be described in detail hereinafter.

In some embodiments, the intersection region 12 is located at a center of the pixel array 10, as illustrated in FIG. 2.

Accordingly, it is easy for light to each the intersection region 12 located at the center of the pixel array 10, such that it is easy for the image sensor 100 to detect the illumination intensity. Thus, the image sensor 100 has a high sensitivity to detection of the illumination intensity.

Figure 4:
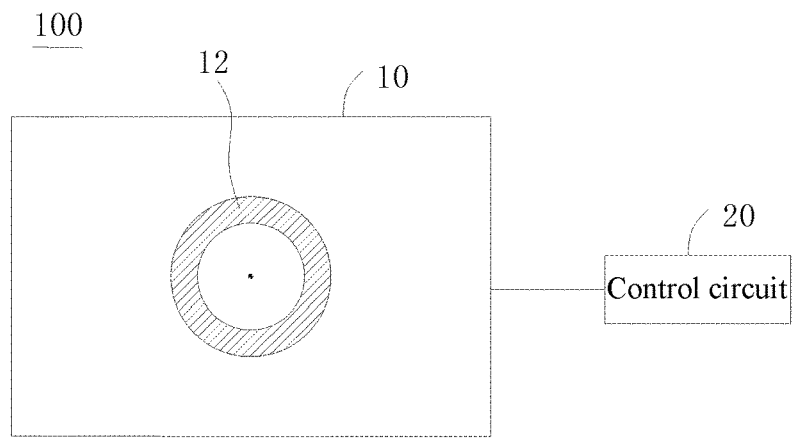
FIG. 4-FIG. 10 are schematic diagrams of an image sensor according to an embodiment of the present disclosure.
Figure 5:
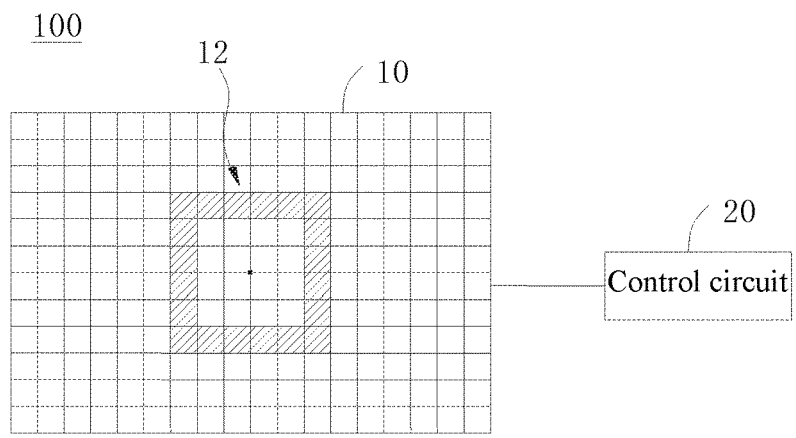

In some embodiments, the intersection region 12 is an annular intersection region 12, which surrounds the center of the pixel array 10, as illustrated in FIG. 4 and FIG. 5.

In some embodiments, the annular intersection region 12 is in the shape of a circular ring, as illustrated in FIG. 4. Since the annular intersection region 12 includes a plurality of pixels and each pixel may be in the shape of a circle or a polygon, each of an inner boundary and an outer boundary of the annular intersection region 12 can be formed by a plurality of line segments, and essentially in the shape of a circle.

In some embodiments, the annular intersection region 12 may be in the shape of square ring, as illustrated in FIG. 5. In some embodiments, the annular intersection region 12 can be in different shapes from the circular ring or the square ring, for example, in the shape of an irregular ring.

In some embodiments, the intersection region 12 may be disposed centrally symmetric about the center of the pixel array 10. In this case, the region surrounding the center of the pixel array 10 can detect the illumination intensity, such that the sensitivity of the image sensor 10 to detection of the illumination intensity can be improved.

In some embodiments, there are at least two intersection regions 12. The at least two intersection regions 12 are centered about the center of the pixel array 10 and evenly spaced. For example, there may be two, three, four, or five intersection regions 12.

The number of the intersection regions 12 can be set according to actual situations, which is not limited herein. Further, each intersection region 12 can be in the shape of a circle, a circular sector, a polygon or the like, which is not limited herein.

Figure 6:
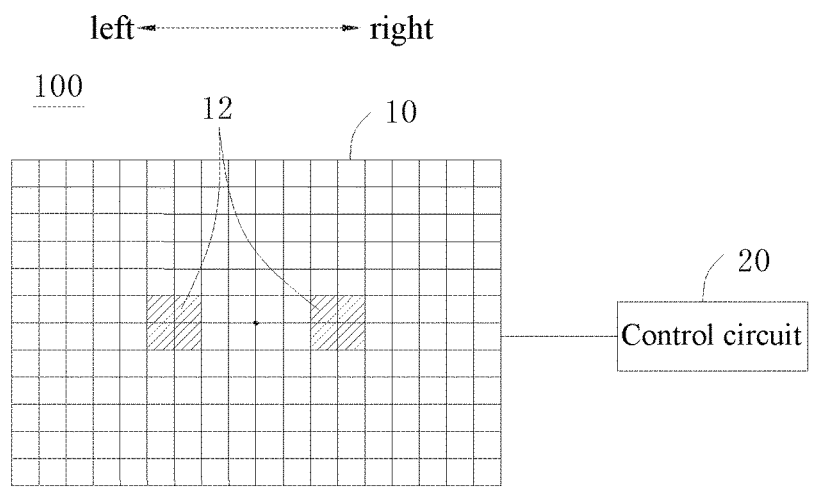

In some embodiments, when the number of the intersection regions 12 is two, the two intersection regions 12 are symmetrically disposed on the left and right sides of the center of the pixel array 10, as illustrated in FIG. 6.

Figure 11:
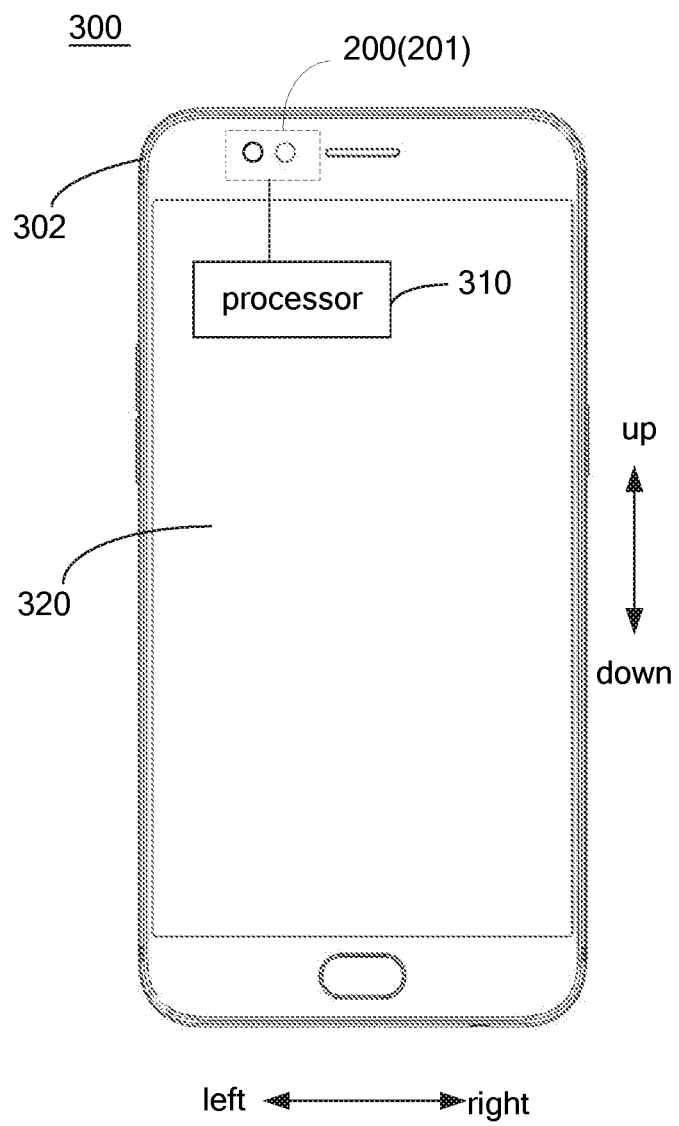
FIG. 11 is a front view of an electronic device according to an embodiment of the present disclosure.

In some embodiments, when the image sensor 100 is applied in the electronic device 300 such as a cell phone, as illustrated in FIG. 11, a left-right direction of the pixel array 10 corresponds to a transverse direction of the electronic device 300. In other words, the two intersection regions 12 are disposed in parallel along the transverse direction of the electronic device 300, such that when the electronic device 300 inclines in the transverse direction, at least one intersection region 12 can detect the illumination intensity, thus facilitating to improve the sensitivity of the image sensor 100 to detection of the illumination intensity.

Figure 7:
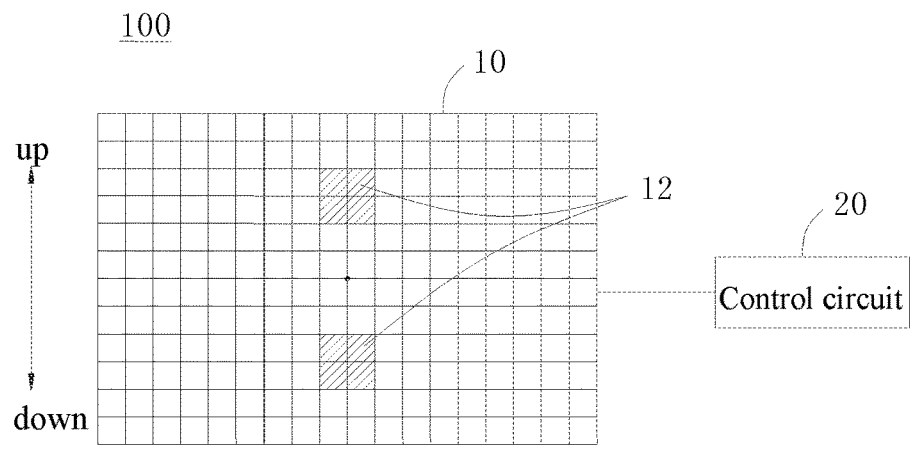

In some embodiments, when there are two intersection regions 12, the two intersection regions 12 are symmetrically disposed above and under the center of the pixel array 10, as illustrated in FIG. 7.

In some embodiments, when the image sensor 100 is applied in the electronic device 300 such as a cell phone, an up-down direction of the pixel array 10 corresponds to a longitudinal direction of the electronic device 300. In other words, the two intersection regions 12 are disposed in parallel along the longitudinal direction of the electronic device 300, such that when the electronic device 300 inclines in the longitudinal direction, at least one intersection region 12 can detect the illumination intensity, thus facilitating to improve the sensitivity of the image sensor 100 to detection of the illumination intensity.

Figure 8:
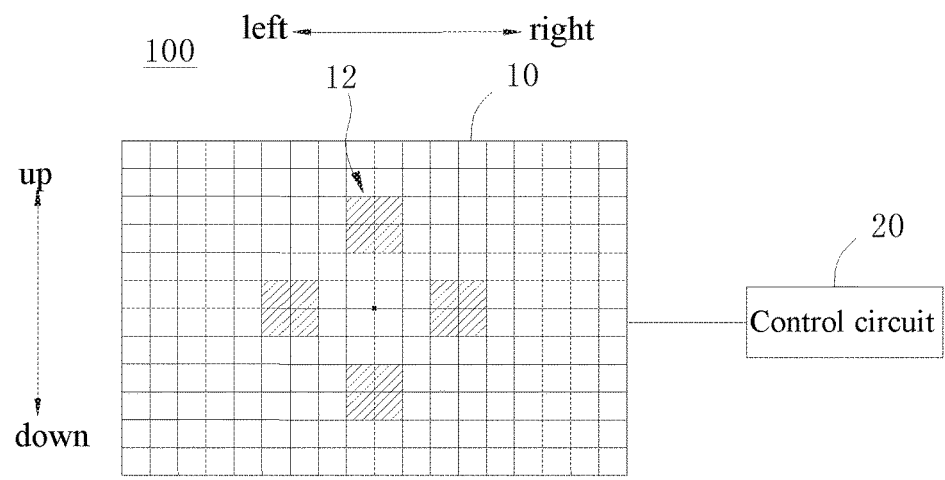

In some embodiments, there are four intersection regions 12. Two intersection regions 12 are symmetrically disposed on the left and right sides of the center of the pixel array 10, and the other two intersection regions 12 are symmetrically disposed above and under the center of the pixel array 10, as illustrated in FIG. 8.

The above-mentioned transverse direction of the electronic device 300 refers to, for example, the left-right direction illustrated in FIG. 11. The above-mentioned longitudinal direction of the electronic device 300 refers to, for example, the up-down direction illustrated in FIG. 11.

Figure 9:
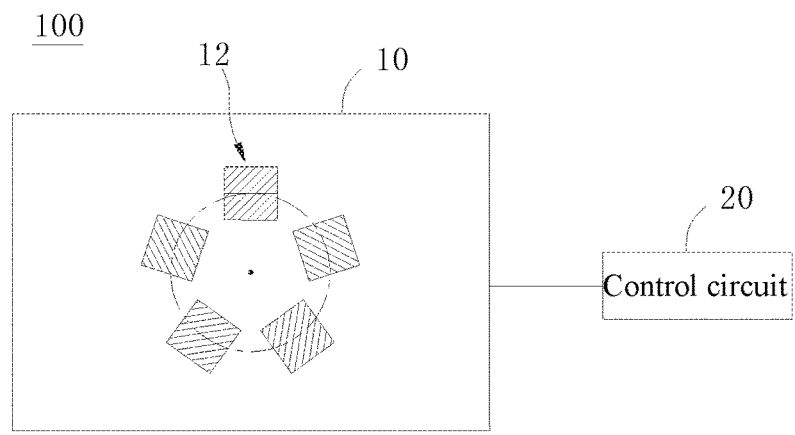

In some embodiments, there are five intersection regions 12, which are centered about the center of the pixel array 10 and evenly spaced. In other words, two adjacent intersection regions 12 and the center of the pixel array 10 form an angle of 72 degree, as illustrated in FIG. 9.

In some embodiments, when there is a plurality of intersection regions, the plurality of intersection regions 12 have the same area.

When the pixel array 10 is in a regular shape, the center of the pixel array 10 refers to a geometric center of the regular shape. For example, when the pixel array 10 is in the shape of a circle, the center of the pixel array 10 is the center of the circle. For another example, when the pixel array 10 is in the shape of a square, the center of the pixel array 10 refers to an intersection point of diagonal lines of the square.

When the pixel array 10 is in an irregular shape, the center of the pixel array 10 refers to a center of gravity of the pixel array 10.

In some embodiments, a ratio of an area A1 of the intersection region 12 to an area of the pixel array 10 is A1/A2, which ranges from 0.1 to 0.4, i.e., $0.1 \Leftarrow A1/A2 \Leftarrow 0.4$. For example, A1/A2=0.15, 0.2, 0.25, 0.3, 0.35 or the like.

When A1/A2 ranges from 0.1 to 0.4, the number of pixels required to work may be decreased based on the premise that the pixel array 10 detects the illumination intensity, such that power consumption of the image sensor 100 can be reduced.

Figure 10:
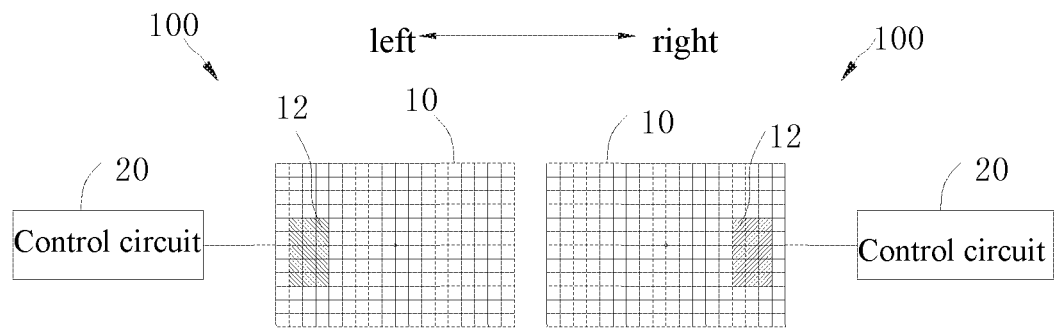

Referring to FIG. 10, in some embodiments, the intersection region 12 in two image sensors 100 may be disposed far away from each other and on different sides of the respective image sensors 100.

In the embodiment illustrated in FIG. 10, a left intersection region 12 is disposed on the left of the left image sensor 100. A right intersection region 12 is disposed on the right of the right image sensor 100. Accordingly, the camera assembly 200 can detect the illumination intensity in a wide range and obtain more accurate detection results.

Referring to FIG. 11, the electronic device 300 according to embodiments of the present disclosure includes the camera assembly 200 mentioned in any of the above embodiments and a processor 310. The processor 310 is configured to generate the light sensing instruction and the imaging instruction. The electronic device 300 may be a device provided with a display screen, such as a cell phone, a panel computer or a smart wearable device or the like.

In the electronic device 300 according to embodiments of the present disclosure, since one image sensor 100 has both the imaging mode and the light sensing mode, it is unnecessary to set both a camera component and a light sensor component in the electronic device 300 such as the cell phone, such that the space for locating the display screen in the cell phone is increased, thus leading to a high screen-to-body ratio of the cell phone.

In some embodiments, the processor 310 sends the light sensing instruction or the imaging instruction to the control circuit 20. The processor 310 may separately generate and transmit the light sensing instruction, or may separately generate and transmit the imaging instruction.

The light sensing instruction and the imaging instruction can be generated by the processor 310 when receiving an input operation. The input operation can be an operation inputted by the user or by an application environment.

For example, in the cell phone according to embodiments of the present disclosure, the light sensing instruction and the imaging instruction can be generated by the processor 310 after receiving an operation of touching the cell phone or pressing a certain function key from the user.

In some embodiments, the light sensing instruction and the imaging instruction can be generated by the processor 310 when the system time of the cell phone reaches a predetermined time point. The control circuit 20 may be configured to separately receive the light sensing instruction to control the intersection region 12 to detect the illumination intensity, or separately receive the imaging instruction to control the pixel array 10 to acquire the image.

The processor 310 may send the light sensing instruction or the imaging instruction to one control circuit 20 to control a corresponding pixel array 10 to work. The processor 310 may also send the light sensing instruction or the imaging instruction to two control circuits 20 to simultaneously control two pixel arrays 10 to work. The operating mode of each of the two image sensors 10 is shown in table 1.

Referring to FIG. 11, in some embodiments, the electronic device 300 includes a single camera assembly 200 configured as a front camera assembly 201. Thus, the single camera assembly 200 may acquire the illumination intensity ahead of the display screen 320 and the image of an object in front of the display screen 320. The processor 310 can control the brightness of the display screen 320 of the electronic device 300 according to the illumination intensities obtained by the two image sensors 100 in the front camera assembly 201.

In some embodiments, when the intersection regions 12 in two pixel arrays 10 detect a first illumination intensity L1 and a second illumination intensity L2 respectively, the processor 310 is configured to select a maximum of the first illumination intensity L1 and the second illumination intensity L2 as a final illumination intensity Lf, i.e., Lf=Max{L1, L2}.

In some embodiments, when the intersection regions 12 in two pixel arrays 10 detect the first illumination intensity L1 and the second illumination intensity L2 respectively, the processor 310 is configured to obtain a mean value of the first illumination intensity L1 and the second illumination intensity L2 as the final illumination intensity Lf, i.e., Lf=(L1+L2)/2.

Accordingly, the processor 310 can control the brightness of the display screen 320 according to the final illumination intensity Lf. For example, the processor 310 turns up or turns down the brightness of the display screen 320 according to the final illumination intensity Lf.

The final illumination intensity Lf for controlling the brightness of the display screen 320 can be set according to actual situations. The processor 310 can use the final illumination intensity Lf obtained in any of the above embodiments to control the brightness of the display screen 320 in any case. Further, the first illumination intensity L1 is obtained by one image sensor 100, while the second illumination intensity L2 is obtained by the other image sensor 100.

The shell 302 of the electronic device 300 is provided with an aperture allowing light to enter the camera assembly 200 and reach the image sensor 100, such that the electronic device 300 can realize functions of detecting the illumination intensity and acquiring the image.

Figure 12:
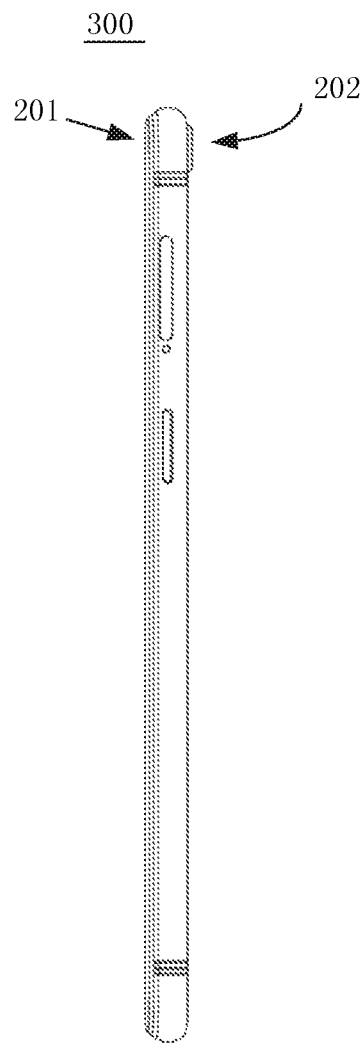
FIG. 12 is a lateral view of an electronic device according to an embodiment of the present disclosure.

In some embodiments, the electronic device 300 includes two camera assemblies 200. One camera assembly 200 is configured as a front camera assembly 201, and the other camera assembly 200 is configured as a rear camera assembly 202, as illustrated in FIG. 12.

The front camera assembly 201 includes two image sensors 100. The rear camera assembly 202 includes two image sensors 100 too. In the four image sensors 100, each image sensor 100 may be in the imaging mode, in the light sensing mode or in the idle mode. For ease of description, the two image sensors 100 in the front camera assembly 201 are referred to as a first image sensor and a second image sensor respectively. The two image sensors 100 in the rear camera assembly 202 are referred to as a third image sensor and a fourth image sensor respectively. When the electronic device 300 is provided with the front camera assembly 201 and the rear camera assembly 202, the operating state of the electronic device 300 includes situations shown in table 2.

TABLE 2

| | | Front camera assembly | | Rear camera assembly | |
|---|---|---|---|---|---|
| | No. | First image sensor | Second image sensor | Third image sensor | Fourth image sensor |
| Operating state | 1 | Imaging mode | Idle mode | Imaging mode | Idle mode |
| | 2 | Imaging mode | Imaging mode | Imaging mode | Imaging mode |
| | 3 | Imaging mode | Light sensing mode | Imaging mode | Light sensing mode |

TABLE 2-continued

|  | Front camera assembly | | Rear camera assembly | |
| --- | --- | --- | --- | --- |
| No. | First image sensor | Second image sensor | Third image sensor | Fourth image sensor |
| 4 | Light sensing mode | Idle mode | Light sensing mode | Idle mode |
| 5 | Light sensing mode | Imaging mode | Light sensing mode | Imaging mode |
| 6 | Light sensing mode | Light sensing mode | Light sensing mode | Light sensing mode |
| 7 | Idle mode | Imaging mode | Idle mode | Imaging mode |
| 8 | Idle mode | Light sensing mode | Idle mode | Light sensing mode |
| ... | ... | ... | ... | ... |

As shown in table 2, the operation state of the electronic device 300 may be a combination of operating modes of four image sensors 100.

In some embodiments, when both of the two image sensors 100 in the front camera assembly 201 work in the imaging mode, at least one of the two image sensors 100 in the rear camera assembly 202 works in the light sensing mode.

Accordingly, the processor 301 may control the front camera assembly 201 to take a picture according to the illumination intensity detected by the image sensor 100 of the rear camera assembly 202, such that an image with high quality can be acquired. For example, when the image sensor 100 in the rear camera assembly 202 detect a low illumination intensity, the processor 301 can control the front camera assembly 201 to increase exposure time to acquire an image with high brightness.

Similarly, in some embodiments, when both of the two image sensors 100 in the rear camera assembly 202 work in the imaging mode, at least one of the two image sensors 100 in the front camera assembly 201 works in the light sensing mode.

During usage of the electronic device 300, when the image sensor 100 in the front camera assembly 201 obtains an illumination intensity and the image sensor 100 in the rear camera assembly 202 obtains an illumination intensity, the electronic device 300 may obtain the illumination intensity around the front camera assembly 201 and the illumination intensity around the rear camera assembly 202 simultaneously. For example, when the processor 310 does not generate the imaging instruction, at least one image sensor 100 in the front camera assembly 201 and at least one image sensor 100 in the rear camera assembly 202 work in the light sensing mode.

Taking the electronic device 300 being a cell phone as an example, in some usage scenario, there may be a situation that the illumination intensities on a front face and a back face of the electronic device 300 are different obviously. For example, the user may put the cell phone on the table with the front face opposite to the table top. If the display brightness of the display screen 320 is controlled only according to the illumination intensity on the front face detected by the front camera assembly 201, the display screen 320 may be in a non-display state or in a low-brightness-display state. When the user suddenly picks up the electronic device 300 for using, the electronic device 300 needs to awaken the display screen 320 or to increase the brightness of the display screen 320 in a short time. When the user frequently picks up and puts down the electronic device 300, the electronic device 300 would consume a great quantity of electricity energy for controlling the brightness of the display screen 320.

The electronic device 300 according to embodiments of the present disclosure can detect both the illumination intensity on the front face and the illumination intensity on the back face. When the user puts the cell phone on the table with the front face opposite to the table top, the brightness of the display screen 320 can be controlled according to the illumination intensity on the back face in a certain time period. When the user picks up the electronic device 300 for using, it is unnecessary to change the brightness of the display screen 320, which is convenient to use and saves energy.

In some embodiments, when four image sensors 100 are configured to detect the illumination intensities, the processor 310 can control the brightness of the display screen 320 according to the illumination intensities detected by the four image sensors 100.

In some embodiments, when the intersection regions 12 of two pixel arrays 10 in the front camera assembly 201 detect a first illumination intensity L1 and a second illumination intensity L2 respectively, and the intersection regions 12 of two pixel arrays 10 in the rear camera assembly 202 detect a third illumination intensity L3 and a fourth illumination intensity L4 respectively, the processor 310 may be configured to select a maximum of the first illumination intensity L1, the second illumination intensity L2, the third illumination intensity L3 and the fourth illumination intensity L4 as the final illumination intensity Lf, i.e., Lf=Max{L1, L2, L3, L4}.

In some embodiments, when the intersection regions 12 of two pixel arrays 10 in the front camera assembly 201 detect the first illumination intensity L1 and the second illumination intensity L2 respectively, and the intersection regions 12 of two pixel arrays 10 in the rear camera assembly 202 detect the third illumination intensity L3 and the fourth illumination intensity L4 respectively, the processor 310 may be configured to obtain a mean value of the first illumination intensity L1 and the second illumination intensity L2 as a front illumination intensity (the front illumination intensity refers to an illumination intensity detected by the light sensing region in the front camera assembly) Lq, to obtain a mean value of the third illumination intensity L3 and the fourth illumination intensity L4 as a rear illumination intensity (the rear illumination intensity refers to an illumination intensity detected by the light sensing region in the rear camera assembly) Lh, and to select a maximum of the front illumination intensity and the rear illumination intensity as the final illumination intensity Lf, i.e., Lq=(L1+L2)/2, Lh=(L3+L4)/2, Lf=Max{Lq, Lh}.

In some embodiments, when the intersection regions 12 of two pixel arrays 10 in the front camera assembly 201 detect the first illumination intensity L1 and the second illumination intensity L2 respectively, and the intersection regions 12 of two pixel arrays 10 in the rear camera assembly 202 detect the third illumination intensity L3 and the fourth illumination intensity L4 respectively, the processor 310 may be configured to select a maximum of the first illumination intensity L1 and the second illumination intensity L2 as a front illumination intensity Lq, to obtain a mean value of the third illumination intensity L3 and the fourth illumination intensity L4 as a rear illumination intensity Lh, and to select a maximum of the front illumination intensity and the rear illumination intensity as the final illumination intensity Lf, i.e., Lq=Max{L1,L2}, Lh=(L3+L4)/2, Lf=Max{Lq, Lh}.

In some embodiments, when the intersection regions 12 of two pixel arrays 10 in the front camera assembly 201 detect the first illumination intensity L1 and the second illumination intensity L2 respectively, and the intersection regions 12 of two pixel arrays 10 in the rear camera assembly 202 detect the third illumination intensity L3 and the fourth illumination intensity L4 respectively, the processor 310 may be configured to obtain a mean value of the first illumination intensity L1 and the second illumination intensity L2 as a front illumination intensity Lq, to select a maximum of the third illumination intensity L3 and the fourth illumination intensity L4 as a rear illumination intensity Lh, and to select a maximum of the front illumination intensity and the rear illumination intensity as the final illumination intensity Lf, i.e., Lq=(L1+L2)/2, Lh=Max{L3, L4}, Lf=Max{Lq, Lh}.

Accordingly, the processor 310 may control the brightness of the display screen 320 according to the final illumination intensity Lf. The final illumination intensity Lf for controlling the brightness of the display screen 320 can be set according to actual situations. The processor 310 can use the final illumination intensity Lf obtained in any of the above embodiments to control the brightness of the display screen 320 in any case.

In some embodiments, when the intersection regions 12 of two pixel arrays 10 in the front camera assembly 201 detect a first illumination intensity L1 and a second illumination intensity L2 respectively, and the intersection region 12 of one pixel array 10 in the rear camera assembly 202 detects a third illumination intensity L3, the processor 310 can control the brightness of the display screen 320 according to the first illumination intensity L1, the second illumination intensity L2 and the third illumination intensity L3.

In some embodiments, the processor 310 may be configured to select a maximum of the first illumination intensity L1 and the second illumination intensity L2 as the front illumination intensity Lq, and to select a maximum of the front illumination intensity Lq and the third illumination intensity L3 as the final illumination intensity Lf, i.e., Lq=Max{L1, L2}, Lf=Max{Lq,L3}.

In some embodiments, the processor 310 may be configured to obtain a mean value of the first illumination intensity L1 and the second illumination intensity L2 as the front illumination intensity Lq, and to select a maximum of the front illumination intensity Lq and the third illumination intensity L3 as the final illumination intensity Lf, i.e., Lq=(L1+L2)/2, Lf=Max{Lq,L3}.

Accordingly, the processor 310 may control the brightness of the display screen 320 according to the final illumination intensity Lf. The final illumination intensity Lf for controlling the brightness of the display screen 320 can be set according to actual situations. The processor 310 can use the final illumination intensity Lf obtained in any of the above embodiments to control the brightness of the display screen 320 in any case.

In some embodiments, when the intersection region 12 of one pixel array 10 in the front camera assembly 201 detects a first illumination intensity L1, and the intersection regions 12 of two pixel array 10 in the rear camera assembly 202 detect a second illumination intensity L2 and a third illumination intensity L3 respectively, the processor 310 can control the brightness of the display screen 320 according to the first illumination intensity L1, the second illumination intensity L2 and the third illumination intensity L3.

In some embodiments, the processor 310 may be configured to select a maximum of the second illumination intensity L2 and the third illumination intensity L3 as the rear illumination intensity Lh, and to select a maximum of the rear illumination intensity Lh and the first illumination intensity L1 as the final illumination intensity Lf, i.e., Lh=Max{L2, L3}, Lf=Max{Lh,L1}.

In some embodiments, the processor 310 may be configured to obtain a mean value of the second illumination intensity L2 and the third illumination intensity L3 as the rear illumination intensity Lh, and to select a maximum of the rear illumination intensity Lh and the first illumination intensity L1 as the final illumination intensity Lf, i.e., Lh=(L2+L3)/2, Lf=Max{Lh,L1}.

Accordingly, the processor 310 may control the brightness of the display screen 320 according to the final illumination intensity Lf. The final illumination intensity Lf for controlling the brightness of the display screen 320 can be set according to actual situations. The processor 310 can use the final illumination intensity Lf obtained in any of the above embodiments to control the brightness of the display screen 320 in any case.

Referring to FIGS. 11-15, in some embodiments, the electronic device 300 further includes a single different camera assembly 400. The single different camera assembly 400 includes an image sensor 410. The image sensor 410 includes a pixel array 412 and a control circuit 414. The pixel array 412 of the image sensor 410 includes a plurality of row pixels and a plurality of column pixels. The control circuit 414 of the image sensor 410 is configured to control the image sensor 410 to work in the imaging mode or in the light sensing mode. The control circuit 414 of the image sensor 410 is further configured to receive a light sensing instruction to control an intersection region 416 of a part of row pixels and a part of column pixels in the pixel array 412 of the image sensor 410 to detect an illumination intensity, so as to enable the image sensor 410 to work in the light sensing mode, and to receive an imaging instruction to control the pixel array 412 of the image sensor 410 to acquire an image, so as to enable the image sensor 410 to work in the imaging mode.

The image sensor 410 is essentially the same as the image sensor 100. The description for the image sensor 100 is suitable for the image sensor 410. For example, the intersection region 416 of the image sensor 410 may be located at a center of the pixel array 412 of the image sensor 410. Thus, regarding not mentioned parts of the image sensor 410, reference can be made to description for those of the image sensor 100, which is not described herein.

Further, in some embodiments, the different camera assembly 400 further includes a circuit board 420, a filter 430 and a lens 440. The image sensor 410 is arranged on the circuit board 420 of the different camera assembly 400. The filter 430 of the different camera assembly 400 is disposed above the image sensor 410. The lens 440 of the different camera assembly 400 is disposed above on the filter 430.

Figure 13:
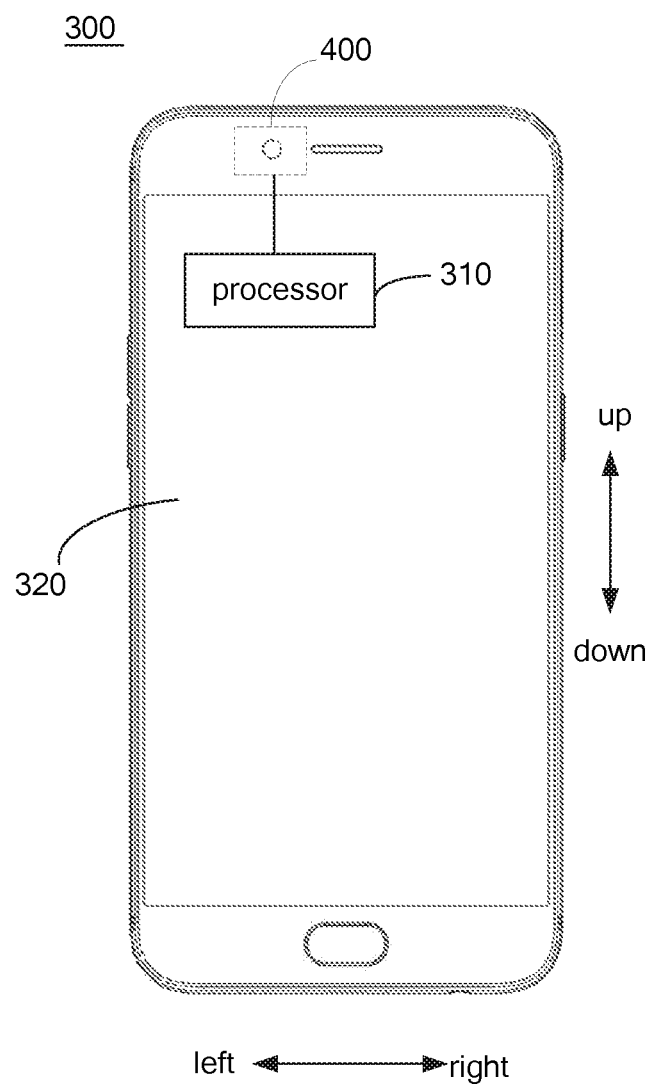
FIG. 13 is another front view of an electronic device according to an embodiment of the present disclosure.
Figure 14:
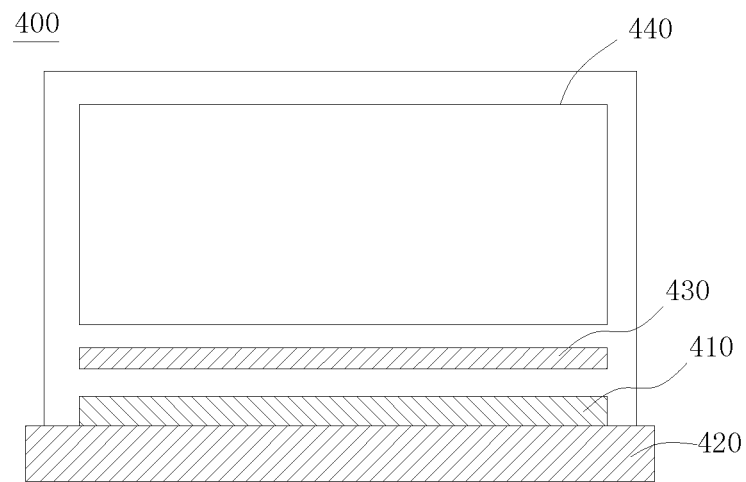
FIG. 14 is a block diagram of a camera assembly according to an embodiment of the present disclosure.
Figure 15:
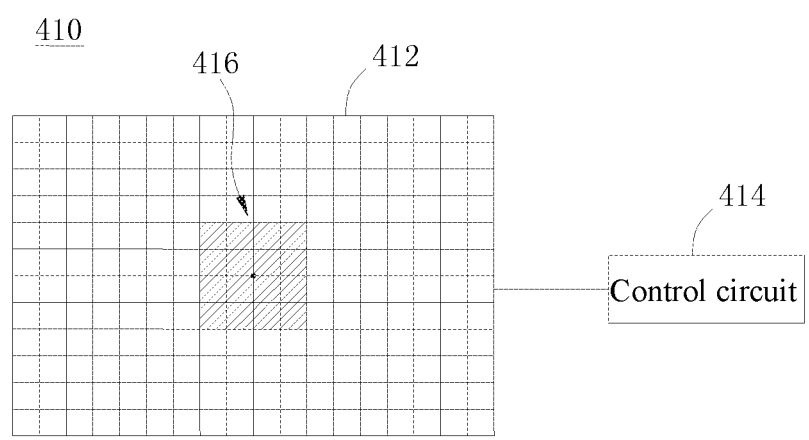
FIG. 15 is a schematic diagram of an image sensor according to an embodiment of the present disclosure.

In some embodiments, the electronic device 300 includes a single camera assembly 200 configured as the front camera assembly. The different camera assembly 400 is configured as the rear camera assembly. In another embodiment, the electronic device 300 includes a single camera assembly 200 configured as the rear camera assembly, and the different camera assembly 400 is configured as the front camera assembly, as illustrated in FIG. 13.

The electronic device 300 further includes a battery, a power supply circuit and a memory etc. The battery is configured to supply power for the electronic device 300. The power supply circuit is coupled to the battery, and configured to supply power for the electronic device 300. The memory is configured to store data information, such as program code.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A camera assembly, comprising a first image sensor and a second image sensor, wherein each of the first image sensor and the second image sensor comprises:
   a pixel array, comprising a plurality of row pixels and a plurality of column pixels; and
   a control circuit, configured to:
      control the image sensor to work in an imaging mode or in a light sensing mode;
      receive a light sensing instruction to control an intersection region of a part of row pixels and a part of column pixels in the pixel array to detect an illumination intensity, so as to enable the image sensor to work in the light sensing mode; and
      receive an imaging instruction to control the pixel array to acquire an image, so as to enable the image sensor to work in the imaging mode,
   wherein the intersection region of the first image sensor and the intersection region of the second image sensor are disposed away from each other and on different sides of the first image sensor and the second image sensor.

2. The camera assembly according to claim 1, wherein the intersection region of the first image sensor is disposed on a first side of the first image sensor and the intersection region of the second image sensor is disposed on a second side of the second image sensor, the first side being opposite the second side.

3. The camera assembly according to claim 2, the first side being a left side of the first image sensor, the second side being a right side of the second image sensor.

4. The camera assembly according to claim 1, wherein, the at least two intersection regions have the same area.

5. The camera assembly according to claim 1, wherein a ratio of an area of the intersection region to an area of the pixel array ranges from 0.1 to 0.4.

6. The camera assembly according to claim 5, wherein the camera assembly comprises a lens above each filter, an optical axis of each lens is aligned with a center of the respective first and the second image sensor.

7. The camera assembly according to claim 1, wherein the camera assembly comprises a filter above each of the first image sensor and the second image sensor.

8. A mobile electronic device, comprising a camera assembly and a processor; wherein, the camera assembly comprises a first image sensor and a second image sensor; wherein each of the first image sensor and the second image sensor comprises a pixel array, comprising a plurality of row pixels and a plurality of column pixels; and a control circuit, configured to: control the image sensor to work in an imaging mode or in a light sensing mode; receive a light sensing instruction to control an intersection region of a part of row pixels and a part of column pixels in the pixel array to detect an illumination intensity, so as to enable the image sensor to work in the light sensing mode; and receive an imaging instruction to control the pixel array to acquire an image, so as to enable the image sensor to work in the imaging mode;
   wherein:
      the intersection region of the first image sensor and the intersection region of the second image sensor are disposed away from each other and on different sides of respective image sensors, and
      the processor is configured to generate the light sensing instruction and the imaging instruction.

9. The mobile electronic device according to claim 8, wherein the mobile electronic device comprises one camera assembly configured as a front camera assembly;
   wherein when intersection regions in two pixel arrays of the camera assembly detect a first illumination intensity and a second illumination intensity respectively, the processor is configured to:
      determine a maximum of the first illumination intensity and the second illumination intensity as a final illumination intensity; or
      obtain a mean value of the first illumination intensity and the second illumination intensity as a final illumination intensity.

10. The mobile electronic device according to claim 8, wherein the mobile electronic device comprises at least two camera assemblies, one of the at least two camera assemblies is configured as a front camera assembly and a further one of the at least two camera assemblies is configured as a rear camera assembly;
    wherein when intersection regions in two pixel arrays of the front camera assembly detect a first illumination intensity and a second illumination intensity respectively, and intersection regions in two pixel arrays of the rear camera assembly detect a third illumination intensity and a fourth illumination intensity respectively, the processor is configured to:
       determine a maximum of the first illumination intensity, the second illumination intensity, the third illumination intensity and the fourth illumination intensity as a final illumination intensity; or
       obtain a mean value of the first illumination intensity and the second illumination intensity as a front illumination intensity, obtain a mean value of the third illumination intensity and the fourth illumination intensity as a rear illumination intensity, and determine a maximum of the front illumination intensity and the rear illumination intensity as a final illumination intensity; or
       determine a maximum of the first illumination intensity and the second illumination intensity as a front illumination intensity, obtain a mean value of the third illumination intensity and the fourth illumination intensity as a rear illumination intensity, and determine a maximum of the front illumination intensity and the rear illumination intensity as a final illumination intensity; or
       obtain a mean value of the first illumination intensity and the second illumination intensity as a front illumination intensity, determine a maximum of the third illumination intensity and the fourth illumination intensity as a rear illumination intensity, and determine a maximum of the front illumination intensity and the rear illumination intensity as a final illumination intensity.

11. The mobile electronic device according to claim 8, wherein the mobile electronic device comprises at least two camera assemblies, one of the at least two camera assemblies is configured as a front camera assembly and a further one of the at least two camera assemblies is configured as a rear camera assembly;

wherein when an intersection region in a pixel array of the front camera assembly detects a first illumination intensity, and an intersection region in a pixel array of the rear camera assembly detects a second illumination intensity, the processor is configured to:

determine a maximum of the first illumination intensity and the second illumination intensity as a final illumination intensity.

12. The mobile electronic device according to claim 8, wherein the mobile electronic device comprises at least two camera assemblies, one of the at least two camera assemblies is configured as a front camera assembly and a further one of the at least two camera assemblies is configured as a rear camera assembly;

wherein when intersection regions in two pixel arrays of the front camera assembly detect a first illumination intensity and a second illumination intensity respectively, and an intersection region in a pixel array of the rear camera assembly detects a third illumination intensity, the processor is configured to:

determine a maximum of the first illumination intensity and the second illumination intensity as a front illumination intensity, and determine a maximum of the front illumination intensity and the third illumination intensity as a final illumination intensity; or obtain a mean value of the first illumination intensity and the second illumination intensity as a front illumination intensity, and determine a maximum of the front illumination intensity and the third illumination intensity as a final illumination intensity.

13. The mobile electronic device according to claim 8, wherein the mobile electronic device comprises at least two camera assemblies, one of the at least two camera assemblies is configured as a front camera assembly and a further one of the at least two camera assemblies is configured as a rear camera assembly;

wherein when an intersection region in a pixel array of the front camera assembly detects a first illumination intensity, and intersection regions in two pixel arrays of the rear camera assembly detect a second illumination intensity and a third illumination intensity respectively, the processor is configured to:

determine a maximum of the second illumination intensity and the third illumination intensity as a rear illumination intensity, and determine a maximum of the rear illumination intensity and the first illumination intensity as a final illumination intensity; or obtain a mean value of the second illumination intensity and the third illumination intensity as a rear illumination intensity, and determine a maximum of the rear illumination intensity and the first illumination intensity as a final illumination intensity.

14. The mobile electronic device according to claim 8, comprising another one camera assembly, wherein the another one camera assembly comprises an image sensor comprising:

a pixel array, comprising a plurality of row pixels and a plurality of column pixels; and a control circuit, configured to:

control the image sensor to work in an imaging mode or in a light sensing region;

receive a light sensing instruction to control an intersection region of a part of row pixels and a part of column pixels to detect an illumination intensity, so as to enable the image sensor to work in the light sensing mode; and receive an imaging instruction to control the pixel array of the image sensor to acquire an image, so as to enable the image sensor to work in the imaging mode.

15. The mobile electronic device according to claim 14, wherein the mobile electronic device comprises one camera assembly configured as one of a front camera assembly and a rear camera assembly, and the another one camera assembly is configured as the other one of the front camera assembly and the rear camera assembly.

16. The mobile electronic device according to claim 8, wherein the mobile electronic device comprises two camera assemblies, one of the two camera assemblies is configured as a front camera assembly, the other one of the two camera assemblies is configured as a rear camera assembly; wherein the front camera assembly and the rear camera assembly are configured such that, when two image sensors of the front camera assembly both work in the imaging mode, at least one image sensor of two image sensors of the rear camera assembly works in the light sensing mode; and when two image sensors of the rear camera assembly both work in the imaging mode, at least one image sensor of two image sensors of the front camera assembly works in the light sensing mode.

17. The mobile electronic device according to claim 8, wherein the intersection region of the first image sensor is disposed on a first side of the first image sensor and the intersection region of the second image sensor is disposed on a second side of the second image sensor, the first side being opposite the second side.

18. The mobile electronic device according to claim 8, the first side being a left side of the first image sensor, the second side being a right side of the second image sensor.

* * * * *